Sept. 21, 1948.   C. F. LEATHERS   2,449,707
WELDING MECHANISM

Filed July 17, 1944   8 Sheets-Sheet 2

INVENTOR.
Chester F. Leathers.
BY
Harness, Dickey & Pierce.
ATTORNEYS.

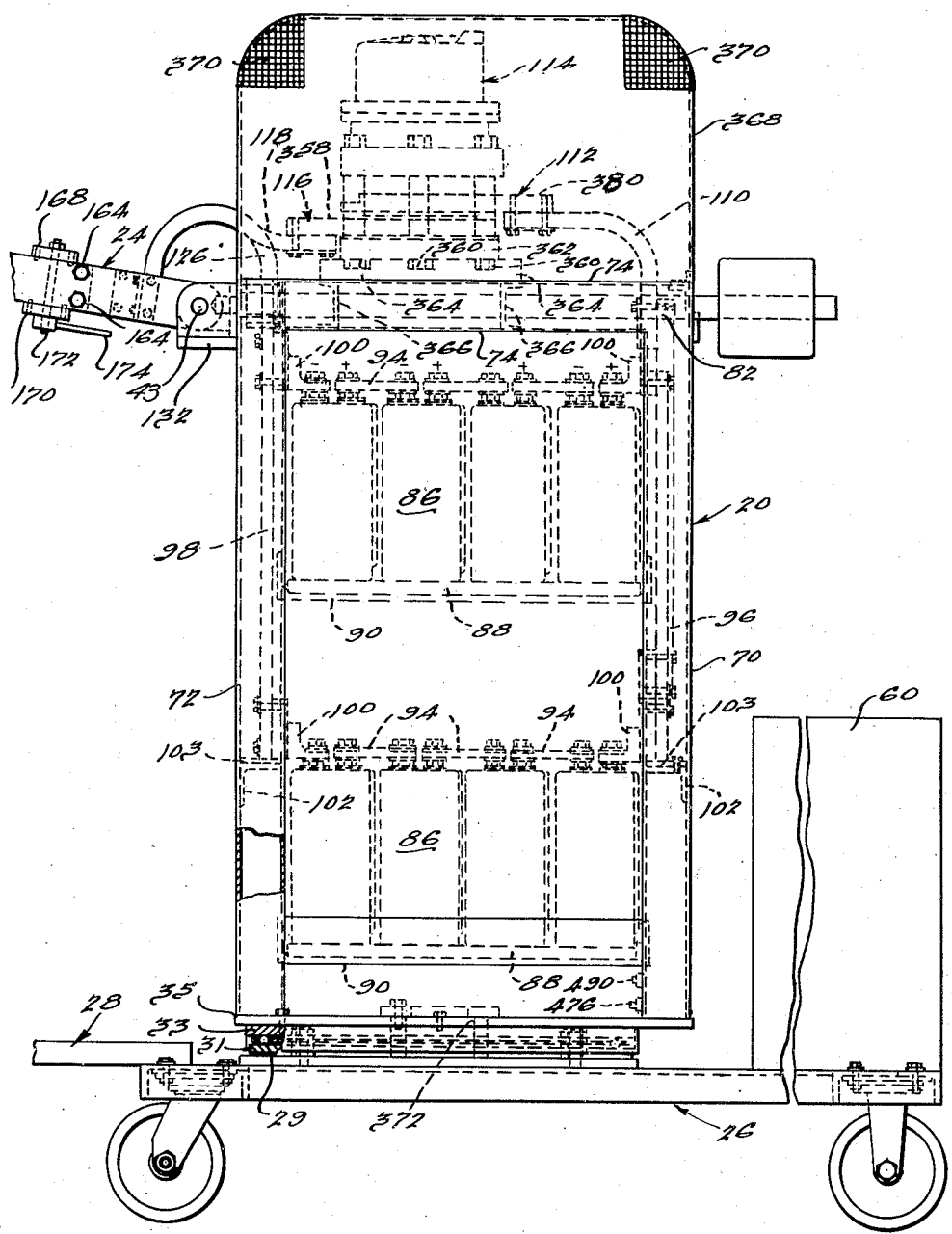

Sept. 21, 1948.　　　C. F. LEATHERS　　　2,449,707
WELDING MECHANISM
Filed July 17, 1944　　　　　　　　　8 Sheets-Sheet 4
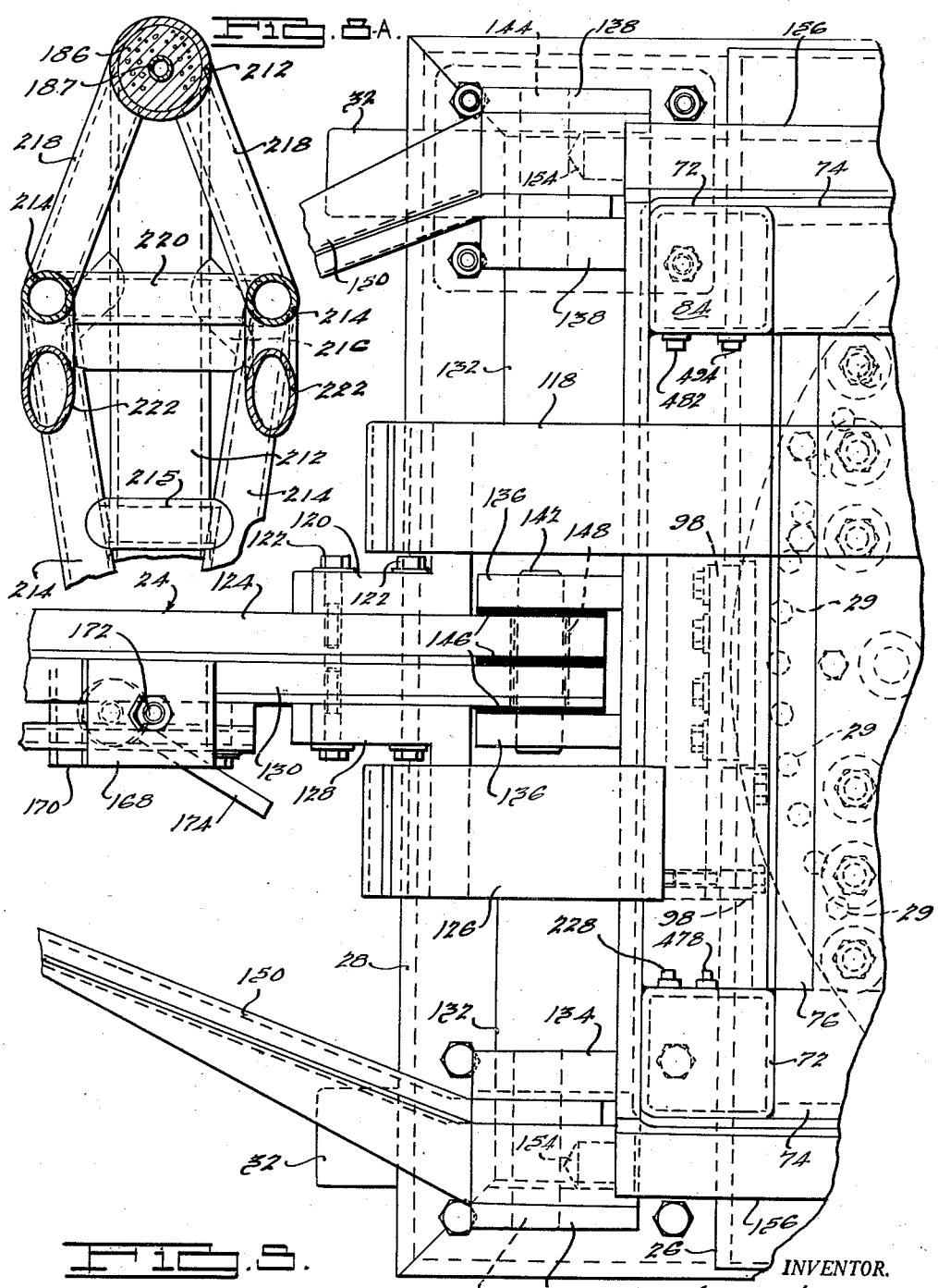
INVENTOR.
Chester F. Leathers.
BY
Harness, Dickey & Pierce.
ATTORNEYS.

Sept. 21, 1948.  C. F. LEATHERS  2,449,707
WELDING MECHANISM
Filed July 17, 1944  8 Sheets-Sheet 5
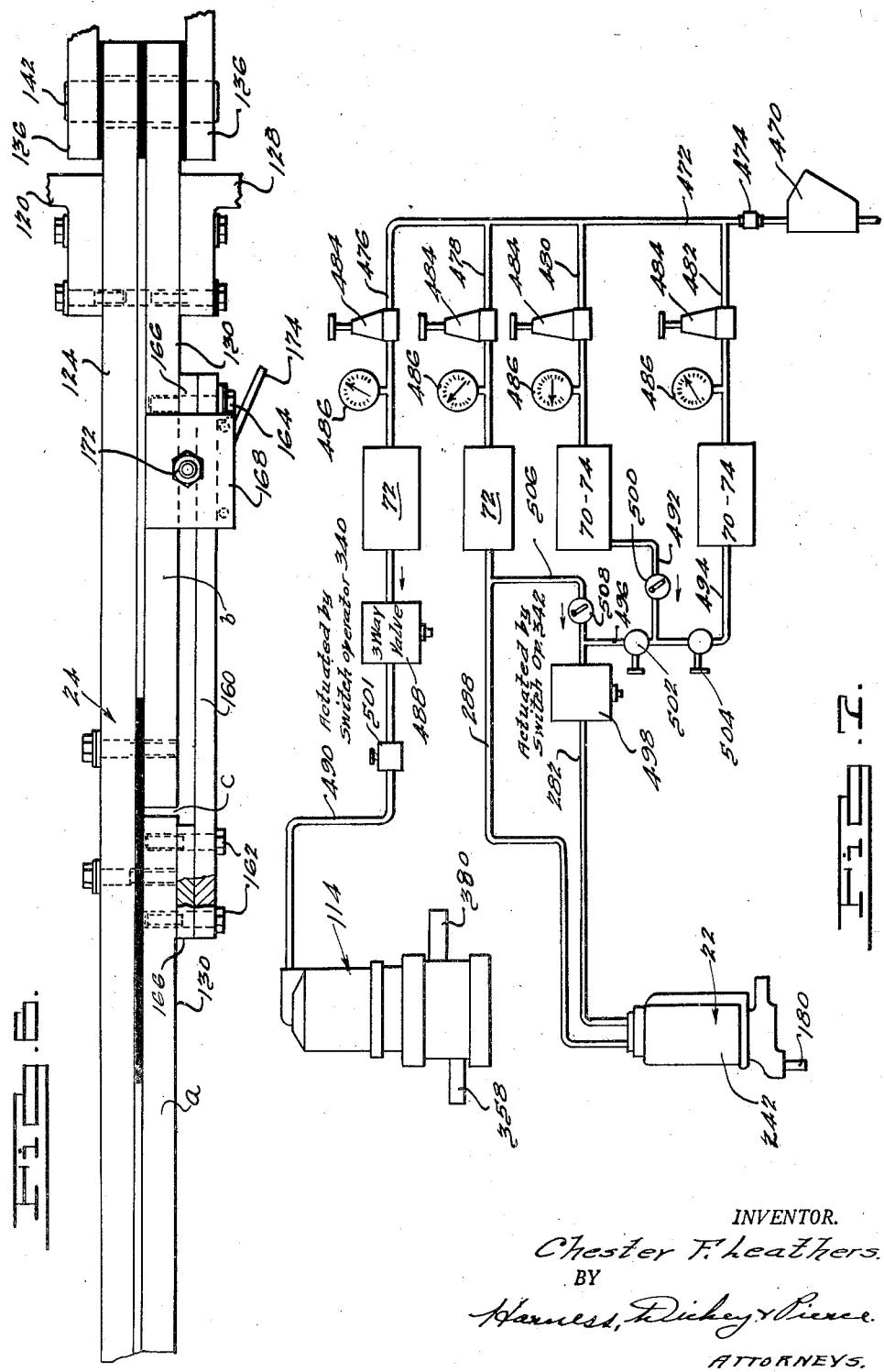
INVENTOR.
Chester F. Leathers.
BY
Harness, Dickey & Pierce.
ATTORNEYS.

Sept. 21, 1948.   C. F. LEATHERS   2,449,707
WELDING MECHANISM

Filed July 17, 1944                 8 Sheets-Sheet 6

INVENTOR.
Chester F. Leathers,
BY
Harness, Dickey & Pierce
ATTORNEYS.

Sept. 21, 1948.　　　C. F. LEATHERS　　　2,449,707
WELDING MECHANISM
Filed July 17, 1944　　　　　　　　8 Sheets-Sheet 7
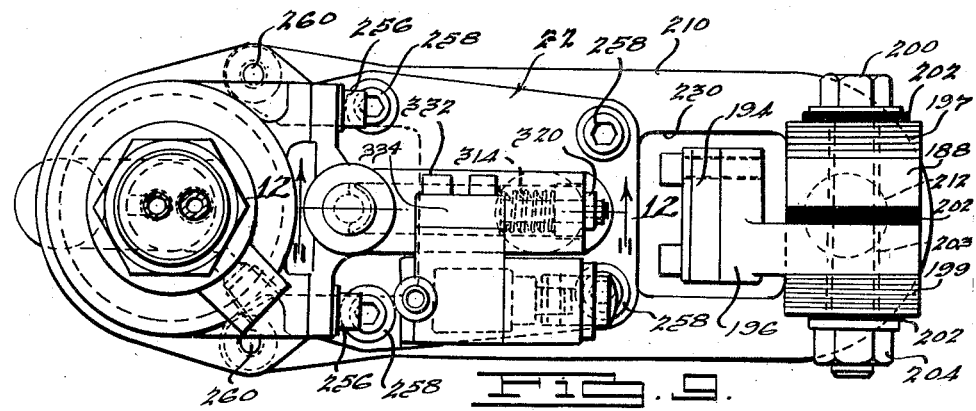
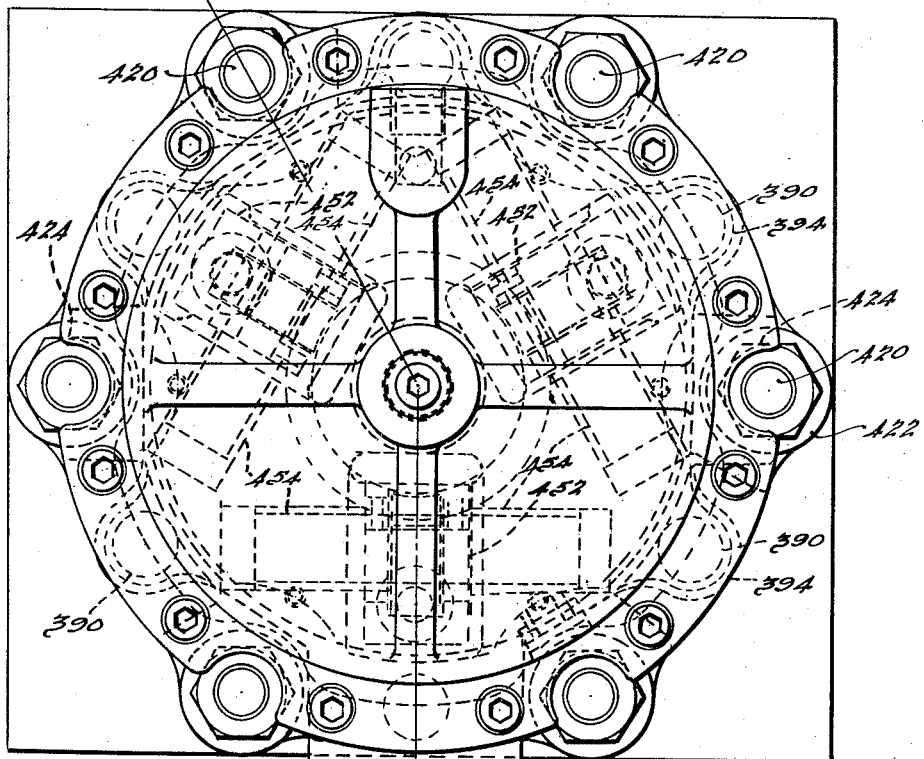
INVENTOR.
Chester F. Leathers.
BY
Harness, Dickey & Pierce
ATTORNEYS.

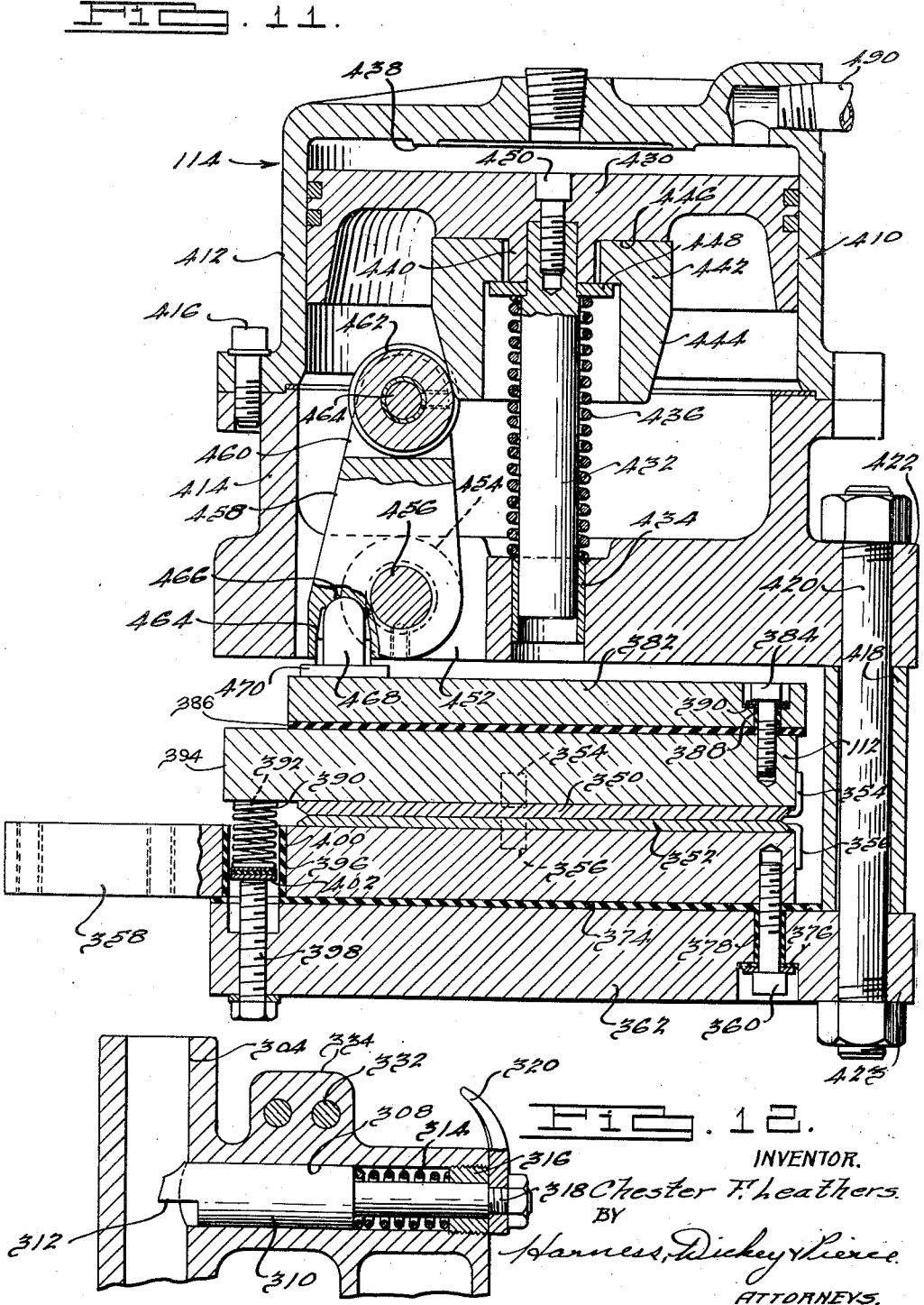

Patented Sept. 21, 1948

2,449,707

UNITED STATES PATENT OFFICE 2,449,707

WELDING MECHANISM

Chester F. Leathers, Detroit, Mich.

Application July 17, 1944, Serial No. 545,322

2 Claims. (Cl. 219—4)

The present invention relates to resistance welding devices and in certain respects is particularly directed to the provision of an improved system utilizing storage batteries as a source of current for making welds. In other respects the invention is particularly directed to the provision of improved elements of welding systems which have a more general application.

Principal objects of the present invention are to provide a relatively simple economically manufactured, readily operated and maintained resistance welding system utilizing electric storage batteries as a source of current for making successive welds; to provide such a system which as a whole is transportable so that it may be readily moved to various parts of a welding shop; to provide such a system comprising generally a power unit and one or more welding guns, the power unit being transportable as aforesaid, and the gun being of the portable type which is adjustably carried by the power unit; to provide such a system wherein the hanger structure for connecting the gun to the power unit also serves as a conductor of electricity for the gun; to provide such a system wherein the transportable unit also carries its own battery charging mechanism, and wherein the capacity of the unit is sufficient to handle a relatively large number of welds without requiring a re-charging or alternatively in which the charging mechanism operates automatically to maintain a predetermined charge on the batteries; and to in general provide a completely self-contained readily transportable welder.

Further objects of the present invention are to provide a welder having an improved frame structure, structural elements whereof are utilized as reservoirs to accommodate fluids, such as air, used in performing certain of the control operations.

Further objects of the present invention are to provide improved contactor mechanism for controlling the flow of current between one or more welding guns and an associated source of power comprising preferably, but not necessarily, one or more electric storage batteries; to provide such a contactor which, basically, employs carbon pile elements, disposed to be separated to interrupt the flow of current, and disposed to be pressed together to complete the circuit through the contactor; to provide such a structure embodying improved means for enabling air pressures of commercial values to act through a relatively small air operated ram and apply desired pressures between the carbon pile elements; and to provide such structures embodying improved means interposed between the carbon pile elements and the air operated ram for multiplying the pressure developed by the ram.

Further objects of the present invention are to provide improved welding guns, which are extremely light in weight and which are consequently extremely easy to manipulate; to provide such constructions employing generally a frame structure and a pair of relatively movable electrodes, the frame structure being constituted primarily by tubular elements; to provide such structures, of the portable type, employing improved means for providing different ranges of movement between the electrodes, to thereby afford a working range and a retracting range.

Other and more detailed objects of the invention appear in the following description and in the appended claims.

In the accompanying drawings, which illustrate preferred embodiments of the invention, and throughout the several views of which, corresponding reference characters are used to designate corresponding parts;

Figure 4 is a view in side elevation of the improved power unit.

Fig. 5 is a fragmentary plan view showing the connection between the improved bus-bar and hanger structure and the power unit.

Figure 6 is a fragmentary plan view of the improved bus-bar and hanger structure.

Figure 7 is a diagrammatic view of the fluid control circuits.

Figure 8A is a fragmentary view in horizontal section taken along the line 8A—8A of Fig. 8.

Figure 9 is a plan view of the gun of Figure 8, taken along the line 9—9 of Figure 8.

Figure 10 is a bottom plan view of the improved contactor.

Figure 11 is a view in vertical section, taken along the line 11—11 of Figure 10 and;

Figure 12 is a fragmentary view, taken along the line 12—12 of Figure 9.

It will be appreciated from a complete understanding of the present invention, that the improvements thereof may be embodied in welders of widely varying capacities and intended for widely differing types of service; that in certain of their broader aspects, many features of the present complete system may be utilized independently of other features; and that the present improvements may be embodied in widely differing structural forms. The present disclosure, therefore, of a particular structural embodiment is to be regarded in an illustrative and not in a limiting sense.

Figure 1:
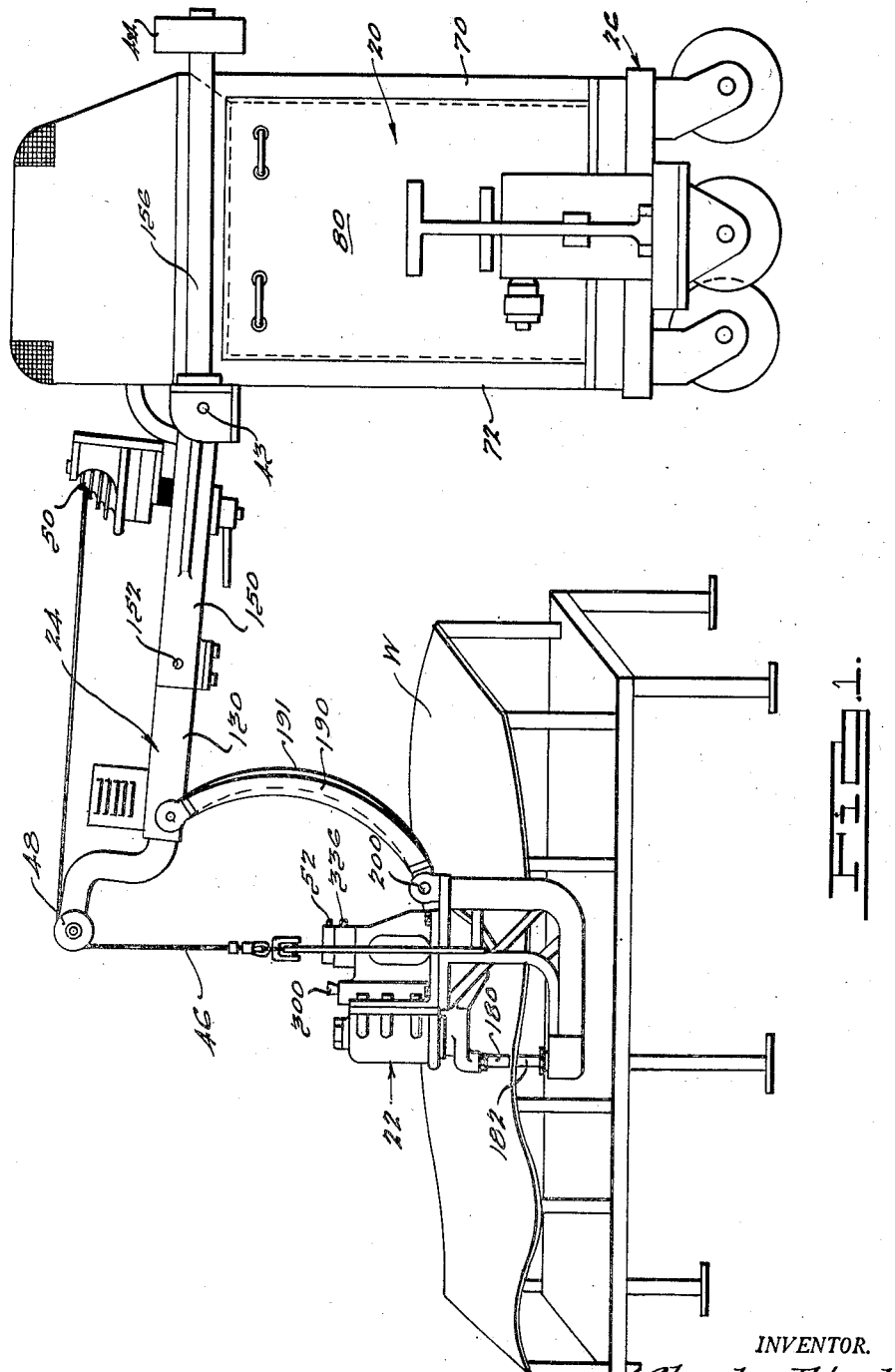
Figure 1 is a view in elevation of a preferred embodiment of the invention.

Referring first to Figure 1, the system as a whole comprises the hereinafter described improved power unit 20, and the improved welding gun 22, which is of the portable pinch-gun type, and which is electrically and mechanically connected to the power unit through the improved bus-bar and hanger structure 24.

Figure 3:
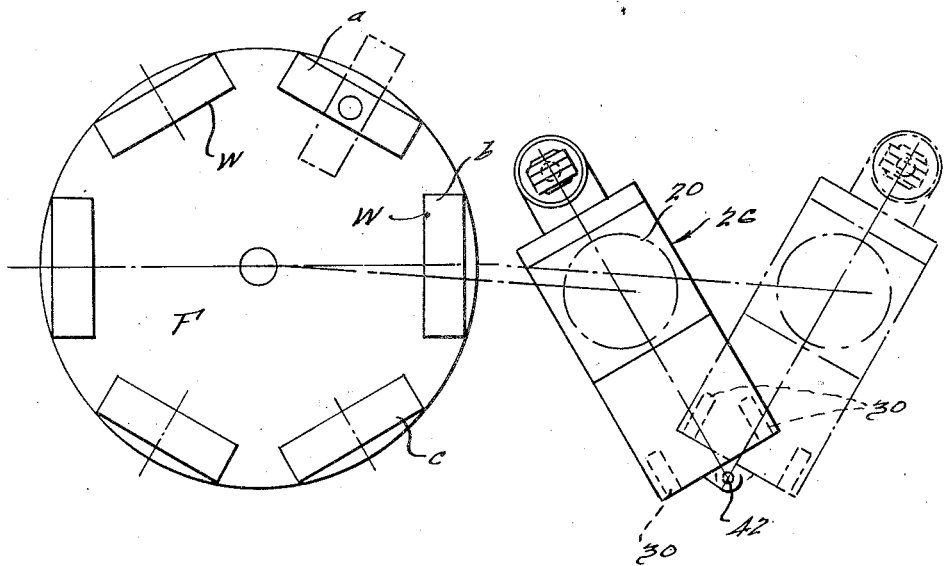
Figure 3 is a diagrammatic view illustrating the adaptability of the present welder.

An important feature of the present invention resides in providing a substantially or entirely self-contained, readily transportable welding system. To accomplish this, the entire system is provided with means which enable it to be transported at will from place to place in the associated shop or factory. As shown, the transport unit comprises an industrial truck 26 of a commercially available type. Truck 26 comprises a usual body structure 28, a pair of rear wheels 30, a pair of swiveled intermediate wheels 32, and a single dirigible and driving front wheel 34, the power unit for which may be housed within the enclosure 36. The truck is provided with a usual manually gripped handle 38 which may be actuated to steer the front wheel 34, and to releasably lock it in either a straight ahead position or a position turned at 90 degrees therefrom. The handle 38 may be provided with a control switch indicated at 40, which controls the starting, stopping and reversing of the associated drive unit 36. Thus, it will be understood that the truck may be started and steered manually through any desired course. In addition, by turning the front wheel 34 to its 90 degree position, the drive unit may be started, and cause the truck 26 to revolve in a circle about a center which lies between the rear wheels 30, which operation is shown diagrammatically in Figure 3. It is usually found that it is unnecessary to anchor the truck to accomplish this operation. If desired, a retractable anchor post 42 may be provided, to establish a center of rotation for the truck. It will be understood that during such rotation of the truck, the intermediate wheels 32 occupy positions as indicated in Figure 1, which swiveling is permitted by the nature of their connection to the truck.

In accordance with the present invention, the power unit 20 and the parts carried thereby are adjustable relative to the truck 26. More particularly, and as is indicated in Figure 4, the truck body carries a lower annular ball race 31, and the unit 20 carries a cooperating upper ball race 33. An annular series of ball bearings 29 is interposed between the races 31 and 33, and enables unit 20 to be freely rotated relative to the truck 26. Thus, for each truck position, the gun 22 may be moved to and used in any position around the circumference of a circle having a radius somewhat in excess of the length of the bus-bar and hanger unit 24. As an example of the freedom which this affords, it will be noted from Figure 3, that, without moving the truck 26, the gun 22 may serve two or more work stations $a$, $b$, and $c$ on the turntable type work holder F. Alternatively, of course, the turntable F may be rotated to bring the successive stations to the gun. This portability of the power unit enables it to carry various types of welding elements, such as pedestal assemblies and the like, as well as the illustrated portable gun 22.

Referring particularly to Figure 1, it will be noticed that the bus-bar and hanger structure 24 is pivotally connected to the power unit 20 at 43. Unit 24 and its counterweights 44 may thus swing in a vertical plane to accommodate the height of the work W. Gun 22 is mechanically supported from unit 24 by means of the cable 46, which is trained over an idler pulley 48, and extends to a spring loaded reel 50. Gun 22 may thus be moved to different vertical positions relative to the hanger structure 24 and may also be universally moved with respect to unit 24.

Figure 2:
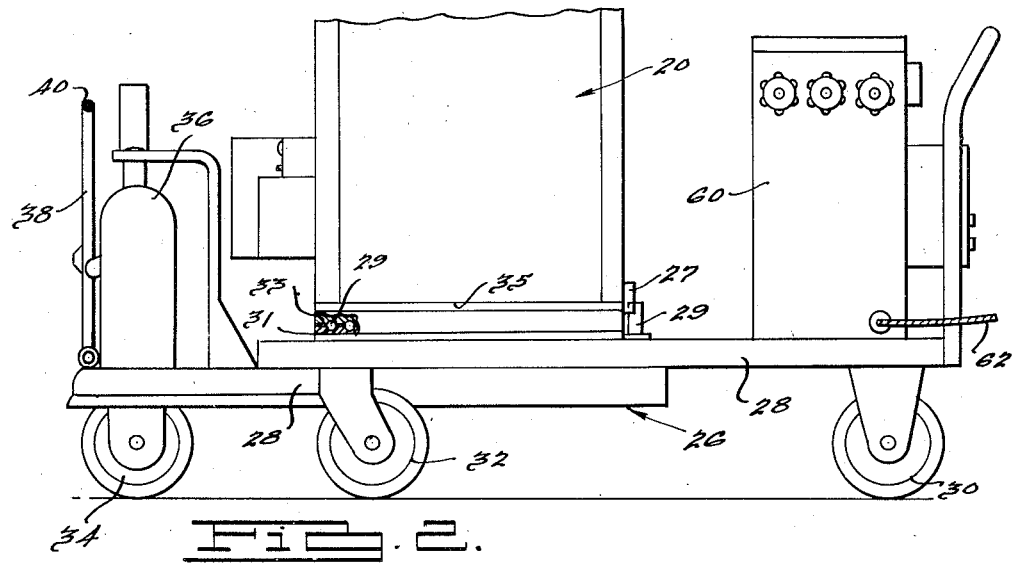
Figure 2 is a fragmentary view in side elevation showing the truck unit in a different position.

As is further illustrated in Figure 2, it is preferred to provide the truck 26 with a usual charging unit 60, which may be conventionally connected by means not shown to the hereinafter described batteries within the unit 20, so as to deliver charging current thereto. Charger 60 may be connected to a suitable source of charging current by means of the relatively light cable 62. As aforesaid, it is preferred to utilize a bank of batteries having sufficient capacity to handle a relatively large number of welds without requiring a re-charging operation of the batteries. In general, however, it is found that lighting and low capacity power circuits are available at the various points in the shop at which it is desired to use the welder. Since the time required for the making of each weld is usually only a very minor fraction of the interval between successive welds, it will be understood that the batteries may be continuously maintained at full charge by drawing only a very small amount of power from the charging connection 62. The unit may therefore be served from the aforementioned lighting or low capacity power circuits. It is of course preferred to provide the charger 60 with the usual automatic control elements which automatically serve to start and stop the charger and maintain the batteries at a desired full charge.

Referring more particularly to Figures 4 and 5, the unit 20 is provided with a generally rectangular frame structure comprising a pair of rear corner posts 70 and a similar pair of front corner posts 72. All four corner posts may be and preferably are of rectangular box section. At their lower ends, all corner posts 70 and 72 may be and preferably are welded to the base plate 35. Each rear corner post 70 and its corresponding front post 72 are interconnected by a horizontal top member 74, also of box section. The upper ends of the front posts 72 are interconnected by an angle member 76, the respectively opposite ends of which are welded or otherwise permanently secured to the corresponding posts at points adjacent the inner edges thereof. A similar angle member interconnects the upper ends of the rear posts 70.

The four faces of the unit 20 are preferably provided with removable covers such as 80, which, upon removal, afford ready access to the interior of the frame structure, to permit inspection or repair of the apparatus contained therein.

It will be appreciated, that as thus far described, the present frame structure is applicable to a wide variety of different welders, independently of the source of power utilized in connection therewith. A further feature of the present frame structure which is of generic utility, resides in utilizing the hollow frame elements as reservoirs or storage spaces for fluids, such as air, which are required in connection with the operation of the welder.

In the present instance, air at different pressures is utilized to control several hereinafter described operations and consequently the frame structure is arranged to define a plurality of reservoirs. More particularly, it will be appreciated that the lower ends of all of the posts 70 and 72 are closed by the bottom plate 35. The upper ends of the rear posts 70 and the rear ends of the top members 74, are mitred, as indicated at 82, so that the interiors of such pairs of posts communicate with each other. The front ends of members 74 abut the inner faces of the front posts 72 respectively and are closed thereby. The upper ends of posts 72 are closed by associated cover plates 84, which may be welded in place thereon. Thus, it will be understood that the present frame structure affords four reservoirs, two of which are constituted by the respective front posts 72. An additional reservoir is constituted by one rear post 70 and its associated cross member 74. The other reservoir is constituted by the remaining members 70 and 74. The fluid circuits associated with these reservoirs are shown in Figure 7, and are described hereinafter.

Since the present system is designed to use batteries as a source of power, the above described frame structure is arranged to accommodate series of electric storage batteries 86 which, as shown, are arranged in upper and lower tiers. The tiers of batteries are carried on associated shelves 88, which, in turn, are supported by angle members 90. One pair of angle members 90, for each shelf 88 is provided. Each angle member 90 is welded to one face of its corresponding front and rear posts 70 and 72.

Relatively heavy and preferably water cooled connectors 94 are provided to interconnect the batteries of the respective banks. These connectors in turn are electrically connected to vertically extending positive and negative bus-bars 96 and 98, by means of terminals 100. The lower terminals 100 are also connected to, but are insulated from the frame members by means of supporting angle brackets 102 and insulators 103. The lower terminals 100 thus afford mechanical support for the bus-bars 96 and 98. The rear or positive bus-bars 96 are electrically connected by means of a usual flexible shunt 110, to one terminal 112 of the hereinafter described contactor 114. The other terminal 116 of the contactor is electrically connected, by means of a similar flexible shunt 118, to a heavy terminal 120, which is secured, by studs 122 to one of the combined hanger and bus-bar members 124 which make up the previously mentioned unit 24. The negative bus-bars 98 are connected by means of a flexible shunt 126 to a bracket 128 which in turn is secured to the other combined bus-bar and hanger member 130.

Coming now to the pivotal connection between the bus-bar and hanger unit 24 and the frame, a relatively heavy bracket 132 is secured to the frame at the top thereof and is provided with three spaced pairs of bearing bosses 134, 136, and 138. These pairs of bearing bosses support bearing pins 140, 142, and 144. Pin 142 rotatably supports the inner ends of the previously mentioned bus-bars 124 and 130, which are insulated from each other by means of the insulating discs 146 and an insulating sleeve 148. Pins 140 and 144 support reinforcing struts 150 which converge towards and are connected to but insulated from the respective sides of the bus-bar unit 24, as indicated at 152 (Figure 1).

The struts 150 are also provided with threaded bores 154 through which corresponding counterweight arms 156, associated with the previously mentioned counterweights 44, are threaded. As will be appreciated, counterweights 44 substantially balance the weight of the unit 24, the gun 22, and associated parts which are carried by these elements. Virtually no effort is therefore required in swinging the unit 24 in the aforesaid vertical plane. Similarly, it will be understood that the spring biased reel 50 substantially balances the weight of the gun 22 so that virtually no effort is involved in manipulating the gun relative to its hanger.

It will be appreciated that in the broader aspects of the invention the welding current may be regulated in various ways such for example as by varying the minimum resistance of the hereinafter described contactor 114, by regulating the control voltage of the charger and by arranging the batteries in various series and parallel arrangements. A preferred way of obtaining a desired range of adjustment of the welding current comprises a rheostat-like arrangement for varying the resistance of the bus-bar 130, which is consequently made in two slightly spaced sections $a$ and $b$, having a gap $c$ therebetween (Figure 6). A bus-bar 160 having a resistance in excess of that of the preferably copper bus-bar 130, is secured to section $a$ of bus-bar 130 by studs 162 and is secured to section $b$ of bus-bar 130 by one or more studs 164. Spacers 166 serve to maintain bus-bar 160 in slightly spaced relation to bus-bar 130. A slide having upper and lower plates 168 and 170 may be releasably clamped to bus-bars 130 and 160, by means of a stud 172 which is provided with a control handle 174. When clamped, in the position shown in Figure 6, plates 168 and 170 electrically connect section $b$ of bus-bar 130 and bus-bar 160. Under these conditions the connection between sections $a$ and $b$ of bus-bar 130 includes substantially the full length of bus-bar 160, so that the resistance of the circuit is at a maximum. As plates 168 and 170 are moved to the left as viewed in Figure 6, less and less of bus-bar 160 is required to be traversed by the current, so that the resistance of the circuit is progressively reduced. When plates 168 and 170 reach their lefthand limit position, determined by the engagement of stud 172 with the lefthand spacer 166, these plates directly overlie both of sections $a$ and $b$ and so directly interconnect these low resistance bus-bar sections, thereby providing a minimum circuit resistance.

Referring now to Figures 1, 8, 8A, 9, and 12, the improved welding gun 22 is illustrated as being of the pinch-gun type, and is provided with upper and lower welding points 180 and 182, which may be of usual water cooled construction. The lower point 182 is electrically connected to an adapter 184, which in turn is electrically connected through a flexible water cooled cable 186, to an associated terminal 188. The upper point 180 is electrically connected to a movable member 192 which in turn is connected, by means of a usual flexible shunt 194, to a terminal 196. Terminals 188 and 196 are connected respectively by bolt 200 to terminals 197 and 199 which are associated respectively with cables 190 and 191. Cables 190 and 191 are connected respectively to the outer ends of bus-bars 124 and 130. Insulating discs 202 and insulating sleeve 203 electrically isolate terminals 188—197 from terminals 196—199. The nut 204 associated with stud 200 is preferably tightened down sufficiently to prevent pivotal movement between the gun and the flexible cables 190 during normal operation, all pivotal movements of the gun relative to the hanger unit 24 being accommodated by the relatively free flexibility of the cables 190, 191.

A feature of the present construction resides in providing an extremely light but very rigid frame structure for the gun. More particularly, the framework of the gun is constituted primarily by an upper plate 210, the single relatively large tubular member 212, a pair of tubular members 214, and interconnecting tubular members 216, 218, 220, and 222. All of the connections between the just mentioned tubular members and the plate-like member 210 may be and preferably are effected by welding, as indicated at 224. It will be noticed that the previously mentioned electric cable 186 is housed within the larger tubular member 212 and it will be understood that although all of the elements 210 through 222 are in electrically continuous relation to each other, substantially all of the welding current passes through the cable 186 rather than through elements 210 through 222. For cooling, cable 186 is provided with a tubular core 187. Water introduced to the core at the inlet 189 returns through the mesh-like cable body and is exhausted through the outlet 191.

Referring particularly to Figure 9, it will be noted that the upper plate 210 is provided with a relatively large aperture 230, through which the bracket 196 passes in spaced relation.

As will be appreciated, the lower welding point 182 is fixed relative to the frame of the gun and the clamping of the work is accomplished by moving the upper point 180 toward the lower point 182. To accomplish this, the previously mentioned bracket 192 is rigidly secured to but is insulated from the movable cylinder 240 of an air operated ram 242, by means of a stud 244, and insulating elements 246, 248, and 250.

Cylinder 240 is slidable within an outer cylinder 252, which is secured to the handle casting 254 by means of vertically spaced pairs of studs 256. The handle casting 254 is rigidly secured to the plate member 210 by studs 258. In addition, cylinder 252 is directly secured to plate 210 by studs 260. Cylinder 242 and the handle casting are insulated from plate 210 by insulator 259 and washers such as 261 and sleeves such as 263 associated with the various connecting studs.

A piston 262, which is movable with respect to the movable cylinder 240, but is fixed with respect to the outer cylinder 252, is rigidly secured by a nut 264 to the lower end of a piston rod 266, the upper end whereof is rigidly secured to and forms a closure for the upper end of the outer cylinder 252, by a nut 268. The upper end of the moving cylinder 240 is closed by a plate 270, which is sealed with respect to the piston rod 266 and the outer cylinder 252 by means of cup washers 272 and 274. Similar cup washers 276 seal the piston 262 with respect to the moving cylinder 240.

The piston rod 266 is provided with an axially extending passage 280, one end whereof communicates with the air line 282 and the other end whereof communicates with the chamber space 284 which lies between piston 262 and the lower end of the movable cylinder. A lateral passage 284 interconnects passage 280 with the chamber space 286 which lies between the upper end of the movable cylinder 240 and the upper end of the outer cylinder 252. The other air line 288 communicates through piston passages 290 and 292 with the cylinder space 294, which lies between piston 262 and the upper end of the movable cylinder 240.

As is described below, in connection with Figure 7, line 288 is continuously supplied with air at a relatively low pressure and line 282 is normally connected to exhaust. Accordingly, the chamber space 294 is continuously subjected to the above-mentioned relatively low air pressure and which pressure is enabled to maintain cylinder 240 in its illustrated elevated position. When it is desired to make a weld, line 282 is connected to a source of superior air pressure, which, when admitted to chamber spaces 284 and 286, is enabled to overcome the pressure in chamber 294, and cause cylinder 240 to move downwardly into clamping engagement with the work. Upon release of the just-mentioned superior pressure, the pressure in chamber 294 is enabled to separate the welding points, the degree of separation being controlled by a control member 300.

Control member 300 is in the form of a stepped post, having a plurality of shoulders 302 spaced therealong. Post 300, which is freely slidable in a bore 304 provided in the handle casting, passes freely in spaced relation through an opening in plate 210 and is threaded at its lower end 306, into a threaded opening in the bracket 192.

Bore 304 communicates with a transverse bore 308, which slidably receives a detent 310 (Fig. 12). Detent 310 is provided with a nose 312 which is disposed to have interlocking engagement with any of the shoulders 302, and is urged to the left as viewed in Figure 12 by means of a compression spring 314 which is seated between a shoulder formed on the detent and a nut 316 which closes the end of bore 308.

The outer and reduced end 318 of detent 310 carries a releasing trigger 320 which is conveniently accessible to the hand of the operator. As to operation, it will be appreciated that the gun parts may be regarded as normally occupying the fully opened position shown in Figure 8, in which position detent 310 engages one or the other of the lower shoulders 302 on the control post 300. If the gun is actuated, by applying the operating pressure to line 282 as aforesaid, point 180 and bracket 192 are carried downwardly, during which movement the post is enabled, by virtue of the tapered surfaces 322, to forcibly retract detent 310. Detent 310 thus does not interfere with closing movements of the gun. When the pressure in line 282 is released, the pressure in chamber 294 is enabled to separate the points, and thereby move post 300 upwardly. This upward movement is limited by the engagement of detent 310 with the first shoulder encountered by the nose thereof in the course of the upward movement of post 300. The gun is consequently enabled to open only to an extent suitable to enable the gun to be moved to the next welding point on the workpiece. Such an opening movement may be of usual magnitude such for example, as one-quarter to one-half an inch, as will be understood. In case a wider point separation is desired for any reason the trigger 320 may be actuated to momentarily withdraw detent 310. Such a momentary withdrawal enables a separating movement equal to the distance between successive shoulders 302. If a full separating movement is desired, trigger 320 may be actuated to hold detent 310 in the retracted position until such movement is completed. It will be appreciated that the provision of the plurality of steps 302 accommodates the structure to points 180—182 of various lengths.

Any suitable means may of course be utilized to control the closing of the gun and the firing of the associated welding circuit. As shown, a push button operated dual switch 330 of a commercially available type is utilized for this purpose. Switch 330 is secured to the handle casting 254 by means of studs 332 which pass through a bracket 334 formed thereon, and are tapped into the switch housing. Switch 330 comprises a manually depressible button 336, which actuates a walking beam 338, which acts against a pair of vertically spaced spring biased switch operators 340 and 342. The button 336 engages the beam 338 at a point which is nearer switch operator 342 than switch operator 340. When the button is depressed accordingly the switch elements associated with operator 342 are closed first. When closed operator 342 forms a fulcrum point for beam 338. Continued button movement consequently depresses operator 340 and crosses the corresponding switch elements. As will be understood, the closure of switch operator 342 may be utilized to effect the closing of the gun and closure of switch operator 340 may be utilized to actuate the hereinafter described contactor and initiate the flow of welding current.

Referring now to Figures 4, 10 and 11, contactor 114 is illustrated as being of the carbon pile type, employing carbon elements which are disposed to be separated to interrupt the circuit through the contactor and which are disposed to be pressed together to complete the circuit through the contactor. A very important feature of the present invention resides in the provision of simple means for applying the pressure to the carbons in such relation as to build up the pressure after initial contact therebetween, and to reduce the pressure prior to separation thereof, at controlled rates, so as to provide proper control of the welding current cycle.

More particularly, the contactor comprises a carbon pile assembly composed, as shown, of only a single pair of circular carbon discs 350 and 352, which are detachably secured respectively, by means of cooperating circumferentially distributed series of clips 354 and 356, to the previously mentioned cooperating terminal members 112 and 116 which may be and preferaly are formed of copper or other highly conductive material.

The lower terminal member 116, which is circular in shape, but is provided with a radially projecting connecting portion 358, for connection to the previously mentioned flexible shunt 118 (Figure 4), is rigidly secured, by means of a plurality of circumferentially distributed studs 360, to a relatively heavy base plate 362. Base plate 362 in turn is secured, through mounting blocks 364 (which may and preferably do incorporate rubber pads or other resilient elements, not shown) to a pair of channel members 366 which are welded to and extend between two upper cross members 74 of the frame structure. An enclosing hood 368 may be and preferably is seated over the top of the frame structure to form an enclosing housing for the contactor. The hood 368 is provided with a plurality of grilled ventilating openings 370, which, in cooperation with other openings which may be provided in the side doors 80, and in the under side of the frame structure (see central opening 372), afford an adequate circulation of air through the entire power unit.

The lower terminal member 116 is insulated from the aforesaid base member 362, as by insulators 374, 376, and 378.

The upper terminal member 112, also of generally circular form, having a radially projecting connecting portion 380 for cooperation with the previously mentioned flexible shunt 110, is rigidly secured to a pressure plate 382, by means of a circumferentially distributed series of studs 384. Members 112 and 382 are insulated from each other by means of insulators 386, 388, and 390.

Carbons 350 and 352 are shown in a position of initial engagement with each other, but are continuously urged to a position in spaced relation to each other, by a circumferentially distributed series of springs 390, the upper ends whereof are seated over bosses 392 which project downwardly from a corresponding series of radial projections 394 formed on the upper terminal member 112. Springs 390 are guided in vertical passages 396 provided therefor in the lower terminal member 116, and the lower ends thereof bear against adjusting studs 398. The passages 396 receive insulating sleeves 400 and the lower ends of the springs are provided with insulating fittings 402. It will be appreciated therefore that springs 390 do not afford an electrical connection between the terminal members 112 and 116.

The operating mechanism for the contactor comprises a ram 410, the cylinder whereof is constituted by upper and lower portions 412 and 414, which are secured together by means of a plurality of circumferentially distributed studs 416. The under side of the lower cylinder portion 414, rests upon a plurality of spacing sleeves 418, which are interposed between cylinder portion 14 and the bottom plate 362. A plurality of studs 420 pass through the flange 422 of the lower cylinder portion 414, through the sleeves 418, and through a corresponding plurality of openings provided therefor in radial enlargements 423 formed on the base plate 362. Studs 420 and spacers 418 thus serve to rigidly interconnect the ram 410 and the base plate 362.

In order to maintain the upper carbon 350 and its terminal member 112 in properly centered relation to the lower carbon 352, the pressure plate 382 is provided with a pair of diametrically opposite radially extending U-shaped projections 424 which loosely embrace a corresponding pair of the spacers 418.

The ram 410 is provided with a piston 430, which is vertically slidable therein, and which is provided with a piston-rod-like member 432, which is slidably received in a guide opening 434 provided in the base portion of the lower cylinder portion 414. A compression spring 436 is seated between the under side of the piston 430 and the upper surface of the just-mentioned base portion, and continuously urges the piston to an upper limit position, in which its upper surface abuts the under side of a downwardly projecting boss 438 formed on the cylinder cover.

Piston 430 is provided with a downwardly projecting neck 440, which passes loosely through a central opening formed in a downwardly presenting circular, cup-like cam member 442, the lower portion of which defines a conical cam surface 444. Cam member 442 is held in place between the piston surface 446, and a collar 448 which is secured to the piston by a central stud 450. Thus, while cam 442 may float to a limited degree in a radial direction with respect to piston 430, it is fixed in place axially of the piston.

The base of the lower cylinder portion 414, is cored or otherwise formed to define a plurality of generally rectangular openings 452, three being shown. Each opening has associated with it a pair of bearing bosses 454 which may be and preferably are cast integrally with the base portion of the cylinder portion 414. The respective pairs of bosses 454 receive trunnions 456, which serve as pivotal supports for pressure members 458 which, functionally, are bell-crank in nature. The upper ends of the bell-cranks 458 are bifurcated to define spaced legs 460, which receive between them grooved rollers 462. Rollers 462 are carried by pins 464, which are supported by the legs 460. The under side of each bell-crank 458 is provided with a vertically extending pin receiving recess 464, the base 466 whereof is spheroidal and forms a socket to receive the correspondingly shaped upper end of a corresponding pressure pin 468. The base 470 of each pressure pin rests freely upon the upper surface of the previously-mentioned pressure plate 382.

With the just-mentioned arrangement, it will be appreciated that pressure is transmitted from the piston 430 to the pressure plate 382, through the three symmetrically arranged bell-cranks 458, it being appreciated that one pressure multiplication is afforded by the cam or wedge-like connection between rollers 462 and the cam member 442, and that a second pressure multiplication is afforded by virtue of the relatively short horizontal distance between the centers of pins 463 and trunnions 456, as compared to the relatively long spacing between the centers of pins 456 and 464. Accordingly, utilizing air pressures of usual magnitudes, approximately 90 pounds, and without requiring an unduly large piston area, extremely high pressures, of the order of 100,000 pounds, can be applied between the carbons 350 and 352.

Before describing the overall operation of the system, reference is made to Figure 7, which shows a diagrammatic layout of air circuits which may be used in the practice of the invention. In this figure, air is supplied from any suitable source 470 to a main header 472. It is within the purview of the invention to carry the source 470 on the truck 26, in which event the storage batteries may also afford a convenient source of energy for the driving motor associated with the usual air compressor. Alternatively, of course, the compressor may be located remotely from the truck 26, and may be releasably coupled to the header 470, as by a connector 474. Header 470 is provided, in the illustrated instance, with four branch lines 476, 478, 480, and 482 which lead, through usual reducing or pressure regulating valves 484, and past gauges 486 to the previously mentioned reservoirs which are constituted by the frame members of the power unit and which are correspondingly designated in Figure 7. One of the reservoirs 72 leads, through a conventional three-way valve 488, and line 490 to the inlet connection for the contactor 114. As will be understood, valve 488 normally isolates its reservoir 72 from the contactor 114, and connects the latter to exhaust. Upon being actuated, which may be accomplished electro-magnetically, valve 488 closes off the exhaust connection and connects contactor 114 to its reservoir 72. As is indicated by the legend in Figure 7, valve 488 may be and preferably is actuated by the switch 340 associated with the welding gun 22, a portion only of which is shown in Figure 7.

The other reservoir 72 is continuously connected by the previously-mentioned line 288 with the chamber space 294 within the gun 22 and so serves to normally maintain the gun in either a partially or entirely open position, depending upon the condition of the control post 300 associated with the gun. Line 288 carries a relatively low pressure, just sufficient for retracting and point dressing purposes.

The remaining two reservoirs 70—74 are connected by lines 492, 494, and 496, with the previously-mentioned line 282, through which air is admitted for actuating the gun. Line 282 contains a three-way valve 498, having the operating characteristics described above in connection with valve 488, and which, as is indicated by the legend, is disposed to be actuated by switch 342 associated with gun 22.

Line 492 contains a usual check valve 500, which permits air flow in only the direction indicated by the arrow and lines 494 and 496 contain usual two-way valves 502 and 504. The reservoir 70—74 associated with check valve 500 carries a lower pressure than does the other reservoir 70—74, which pressure is however substantially in excess of that provided by the reservoir 72 associated with line 288. The reservoirs 70—74 and their associated connections thus permit operation of the gun at either of two initially predeterminable pressures. For example, by opening both of valves 502 and 504, the pressure in line 494 is made available to line 282. By closing valve 504, leaving valve 502 open, the pressure in line 492 is made available to line 282. For point dressing operations, both of valves 502 and 504 may be closed (which of course, may be either manually or automatically effected), whereby the pressure in the reservoir 72 (associated with line 288) is made available to line 282, through line 506, which contains a check valve 508. As previously mentioned, this reservoir 72 contains air at a pressure too low for operating purposes, but suitable for point dressing purposes. Under the indicated conditions, both of lines 282 and 288 are supplied at the same pressure. By reference to Figure 8, however, it will be noticed that the pressure in line 288 acts against a larger effective piston area than does the pressure in line 282, and so is enabled to cause the gun to close with a relatively low pressure between the welding points.

As will be understood, the various regulating valves and gauges may be and preferably are carried at the front of the frame structure of the power unit 20, so as to be readily accessible to the operator of the system. No attempt has been made, except in the diagrammatic showing, Figure 7, to illustrate the arrangement of the piping in unit 20, except to indicate where the piping may be connected into the frame reservoirs. It is noted that the previously-mentioned opening 372 in the base of the frame structure (Fig. 4) affords a convenient means for leading in the air line from the pressure source 470. Such opening also affords a convenient means for bringing in the charging connection from the rectifier, the terminals of which charging source may of course be directly connected to the positive and negative bus-bars 96 and 98, and which air and charging connections may incorporate slip-ring or equivalent instrumentalities to permit an unlimited pivotal movement of the power unit 20 relative to the truck 26. If it is desired to limit such rotation of the power unit to less than 360 degrees, it will be appreciated that the just-mentioned slip-ring connections may be omitted. In Figure 2, cooperating stops 27 and 29 carried respectively by units 20 and 26 cooperate to limit the swiveling of the unit 20 to approximately 360 degrees.

As to operation of the system as a whole, it is believed that the operations of operating the truck 26 will be evident from the previous description. Similarly, it is believed to be evident that the rheostat connection associated with the bus-bar and hanger structure 24 may be adjusted, by releasing the handle 174, so as to interpose a desired amount of resistance into the welding circuit, to accommodate the work to be welded. Under normal circumstances, also, gun 22 may be regarded as occupying the fully opened position shown in Figure 8, under the influence of the pressure in its chamber space 294.

In order to make a weld, and assuming that the work has been introduced between the gun points 180 and 182, the switch button 336 on the gun may be depressed in a single continuous movement. At an intermediate stage of this movement, by virtue of the unbalanced point at which the button acts against the walking beam 338, switch 342 is closed. Through usual circuits (not shown) such action energizes valve 498 associated with gun 22 (Figure 7). Upon being energized, valve 498 connects chambers 284 and 286 of gun 22 to one or the other of the reservoirs 70—74, depending upon the condition of control valve 504. This action causes the gun points to promptly close against the work at a proper welding pressure. Shortly after the gun points close, which action may be expected to take place faster than the depressing movement of button 336, the latter reaches its inner limit position and closes switch 340. The latter action energizes valve 488 through conventional circuits (not shown) and admits air to ram 410. Under the normal conditions, as aforesaid, piston 430 is normally in its upper limit position, as influenced by spring 436, and the upper carbon 350 is spaced above the lower carbon 352, as influenced by the series of springs 390. As the air pressure builds up within the ram 410, piston 430 is forced downwardly against the force of spring 436. This movement carries cam 442 downwardly past the three rollers 462, and forces the latter to move radially outwardly. This movement is communicated to the upper terminal member 112, and causes the latter to move downwardly and bring the carbons 350 and 352 into engagement with each other. This action completes the welding circuit and enables the batteries to supply current through the previously described connections, to the welding gun. The just-mentioned initial engagement of the carbons takes place at an intermediate value of air pressure in ram 410, by virtue of the time delay necessarily present in the build-up of such air pressure to the value established by its reservoir 72. This rate of build-up may, of course, be regulated by interposing a suitable regulating valve in the contactor air line, such a valve being indicated diagrammatically at 501. As the pressure in ram 410 builds up from the initial contactor closing value to the reservoir value, the downward movement of piston 430 tends to continue but may be expected to do so to only a negligibly small degree. The increase in pressure does however proportionately increase the pressure between the carbons, which increase in pressure is accompanied by a corresponding reduction in the electrical resistance of these elements. When the pressure attains the reservoir value, the electrical resistance of the circuit is at a minimum, so far as is determined by the contactor, and is of a value determined by the slide setting of the hanger and bus-bar 24.

It will be noted that under the conditions stated, the electrical resistance of the circuit as a whole is exceedingly low, being composed throughout, except for the relatively short flexible section 190, and the stranded section 186 within the arm 212 of gun 22, of relatively heavy extremely low resistance bus-bar material. These factors make it possible, with a battery voltage as low as 8 volts, to deliver four or more volts to the gun. The system is therefore applicable to the welding of virtually all types of materials, and, without requiring an unduly large number of batteries, may deliver current densities of the order of 30,000 amperes.

As will be understood, the actuation of valves 488 and 498 in response to closure of button 336 are normally accomplished through the intermediary of a usual welding timer, which serves to de-energize in proper sequence, both of valves 488 and 498, at the expiration of an interval suited to the welding operation.

The de-energization of valve 488 vents ram 410 to atmosphere, thereby enabling the separation of the carbons 350 and 352, which action interrupts the welding circuit. The rate of decay of pressure in ram 410 may be controlled by the previously-mentioned regulating valve 501 or by other suitable means. It is usually found that a substantially free escape of air from ram 410 is satisfactory. It will be understood that the decay of pressure in ram 410 causes a corresponding decay of pressure between the carbons, before the latter elements actually separate. It is preferred to so regulate this decay of pressure as to give the welding current time to fall away to a value which is a minor fraction of the maximum value before the carbons actually separate. The inductance of the present welding circuit as a whole is exceedingly low. The rate of decay of welding current, caused by the decrease in pressure between the carbons is consequently very rapid. By virtue of this fact, it is usually satisfactory, as noted above, to permit a substantially unimpeded escape of air from the ram 410 and still attain the desired minimum current value before the carbons separate. As an example, and utilizing a maximum current of the order of 25,000 amperes, it is preferred to delay the separation of the carbons until the welding current has fallen to a value of the order of 1,000 amperes.

Shortly after the de-energization of valve 488 and the interruption of current through the contactor, valve 498 is de-energized and enables the pressure on the gun chamber 294 to separate the points, the degree of separation being governed by post 300, and being, preferably, just sufficient to allow the gun to be readily advanced to the next welding point. If, as previously described, a wider or complete separation of the points is desired, trigger 320 may be withdrawn thereby releasing detent 310 from post 300.

Figure 8:
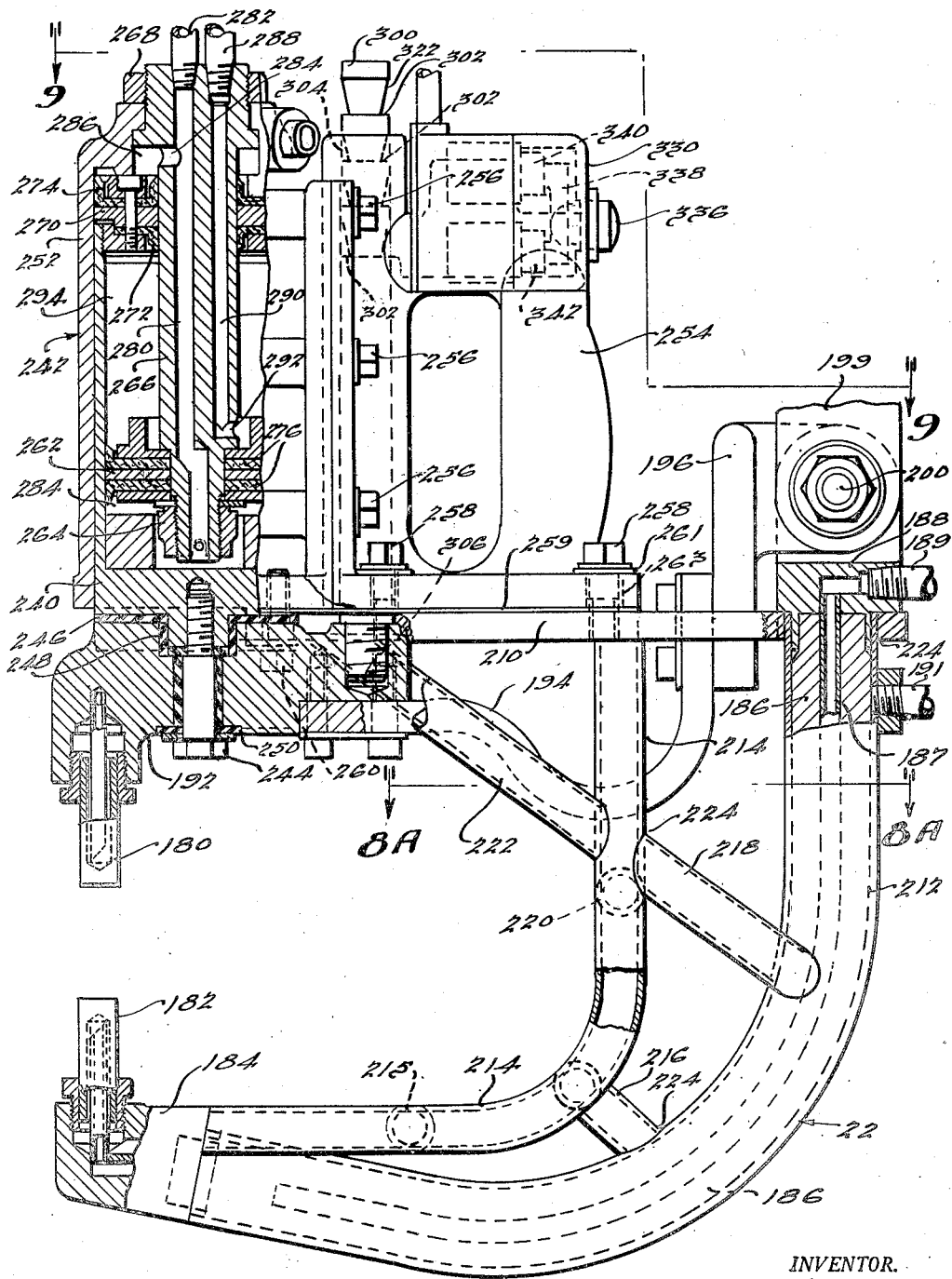
Figure 8 is a view in side elevation, partly in central longitudinal section, of the improved welding gun.

It will be appreciated that although, in order to simplify the drawings, water cooling connections have not been shown or described in detail, it is preferred to supplement the gun cooling connections indicated in Figure 8, with water cooling connections associated with the upper and lower contactor terminals 112 and 116, with the bus-bars 96 and 98, and with the battery connectors 94. It is within the purview of the present invention to provide the truck 26 with a source of sufficient coolant for these cooling circuits, power for the driving means wherefor may be derived from the batteries. Usually, however, adequate sources of coolant are available and may be led to the system in conventional fashion.

Although only a single specific embodiment of the invention has been described in detail, it will be appreciated that various modifications in the form, number, and arrangement of the parts may be made without departing from the spirit and scope of the invention.

What is claimed is:

1. In a welding system, a portable welder, a hanger for mechanically supporting the welder, said hanger including bus-bar means through which power is delivered to the welder, means forming an adjustable supporting connection between the welder and the hanger, and flexible conductor means for electrically connecting the welder to the hanger.

2. In a welder, a frame structure, power means carried by the frame structure, a hanger pivotally connected to the frame structure, a portable welding gun carried by the hanger for universal movement with respect thereto, said hanger including bus-bar means through which power is delivered from the power means to the welding gun, and flexible electrical connections between the gun and the bus-bar means.

CHESTER F. LEATHERS.

REFERENCES CITED

The following references are of record in the file of this patent:

UNITED STATES PATENTS

| Number | Name | Date |
|---|---|---|
| 1,183,264 | Woodrow | May 15, 1916 |
| 1,577,419 | Cushing et al. | Mar. 16, 1926 |
| 1,645,705 | Leswinka | Oct. 18, 1927 |
| 1,665,067 | Meadowcroft | Apr. 3, 1928 |
| 1,723,984 | Von Henke | Aug. 6, 1929 |
| 1,884,066 | Meadowcroft | Oct. 25, 1932 |
| 1,954,426 | Platz | Apr. 10, 1934 |
| 2,122,933 | Eckman | July 5, 1938 |
| 2,126,490 | Martin | Aug. 9, 1938 |
| 2,130,657 | Watkin | Sept. 20, 1938 |
| 2,176,979 | Platz | Oct. 24, 1939 |
| 2,191,912 | Jardine et al. | Feb. 27, 1940 |
| 2,296,286 | Leathers | Sept. 22, 1942 |
| 2,305,042 | Thacker | Dec. 15, 1942 |
| 2,330,465 | Berriman | Sept. 28, 1943 |

FOREIGN PATENTS

| Number | Country | Date |
|---|---|---|
| 812,962 | France | Feb. 15, 1937 |